July 27, 1926.
B. P. JOYCE
1,593,722
FASTENING DEVICE FOR GUN TOOLS
Filed Sept. 6, 1923
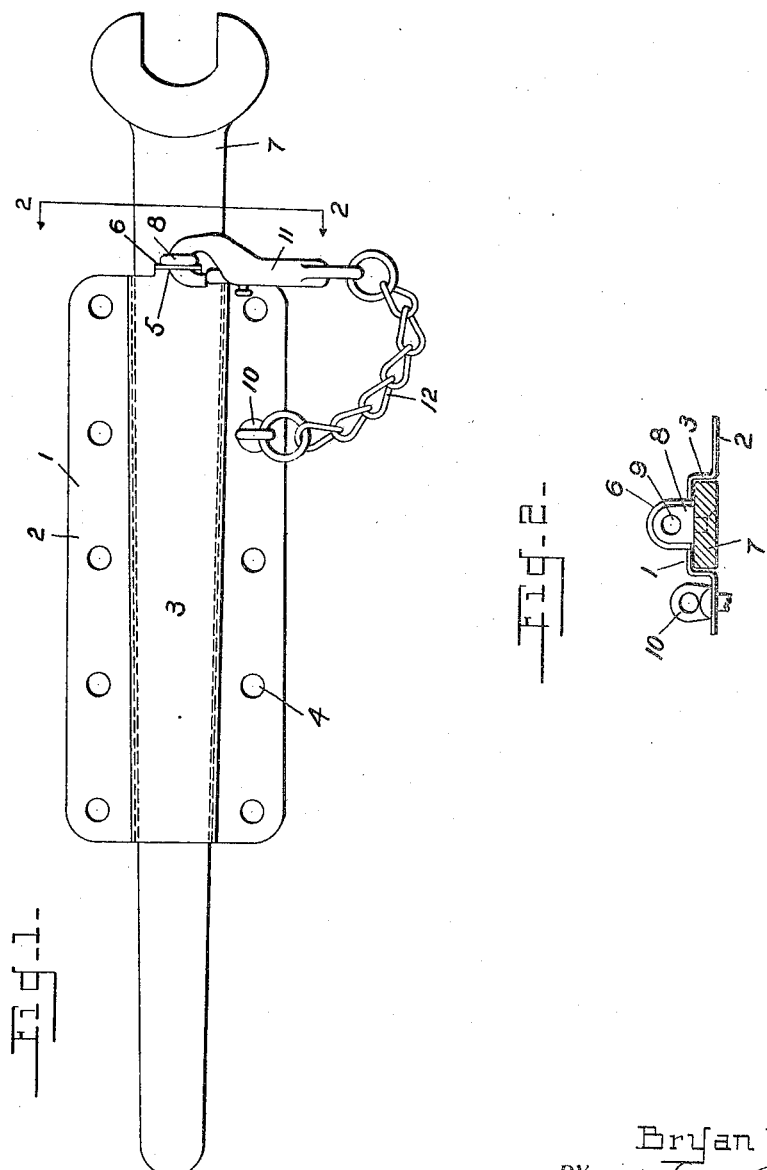
INVENTOR
Bryan P. Joyce
BY W. N. Roach
ATTORNEY Patented July 27, 1926.

1,593,722

UNITED STATES PATENT OFFICE.

BRYAN P. JOYCE, OF DAVENPORT, IOWA, ASSIGNOR TO THOMAS A. CONLON, OF SILVER SPRING, MARYLAND.

FASTENING DEVICE FOR GUN TOOLS.

Application filed September 6, 1923. Serial No. 661,271.

(GRANTED UNDER THE ACT OF MARCH 3, 1883; 22 STAT. L. 625.)

The invention described herein may be used by the Government, or any of its officers or employees in prosecution of work for the Government, or by any other person in the United States, without payment to me of any royalty thereon, in accordance with the act of March 3, 1883.

The present invention relates to fastening devices for gun tools.

The principal object of this invention is to provide means whereby a wrench or similar gun tool may be securely fastened to the gun carriage, caisson or limber in non-use.

Another object of the invention is to provide a sheet metal plate having a socket to receive the tool and means for fastening said tool in said socket.

With the foregoing and other objects in view, my invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing in which—

Fig. 1 is a plan view of the tool and its socket; and

Fig. 2 is a section on the line 2—2 of Fig. 1.

Referring to the drawing by numerals of reference:

Mounted on the caisson, limber or supply wagon is a tool-carrier 1 formed of sheet metal and provided with attaching flanges 2 and bent intermediate said flanges to form a tool receiving socket 3. The attaching flanges are provided with spaced openings whereby the carrier may be riveted or bolted in place. At one end of the socket the carrier in its preferred form is provided with a clip 6 bent up from the socket and formed with an aperture 5. The tool 7 which may be a wrench or any other similar instrument in use on guns is seated in the socket 3 of the carrier by sliding the tool into the socket, the socket being fashioned to conform in shape to the tool. At a point intermediate its length the tool is provided with an eye member 8 which may be riveted or otherwise fastened to the tool. Formed in this member 8 is an aperture 9 alining with the aperture in the clip on the tool socket. Fastened to the carrier as, for instance, by a rivet 10 passing through one of the openings 4 in the flange on said carrier is a snap fastener 11 attached to said rivet by a chain 12. The hook portion of the snap fastener is adapted to be passed through the alined apertures 9 and 5 in the tool and socket, respectively, thus detachably fastening the tool in position in the socket.

From the description given it is apparent that the tool may be readily slid into and removed from the socket and when in said socket is securely fastened therein. By using a carrier such as described the frequent loss of tools is obviated.

While I have described the tool carrier as provided with oppositely directed attaching flanges it is obvious that one only of such flanges might be used and instead of a snap fastener any other suitable type of locking means may be employed.

The snap fastener has been described as being attached by means of a rivet passing through an opening in the tool receiving member. It is obvious that the snap fastener may be directly fastened to the caisson, limber or gun carriage.

I claim:

1. A fastening device for gun tools, comprising a sheet metal plate formed with oppositely directed attaching flanges and bent intermediate said flanges to form a socket, said flanges provided with openings adapted to receive fastening means whereby said plate may be secured in place, a clip bent up from said plate and formed with an opening, a cooperating member on said tool formed with an opening to aline with the opening in said clip and locking means adapted to pass through said alined openings to secure said tool in said socket.

2. A fastening device for gun tools, comprising a sheet metal plate bent to form an attaching portion and a tool receiving socket, a clip on said plate formed with an aperture, a cooperating member on said tool provided with an aperture alining with the aperture in said clip and locking means adapted to pass through said alined apertures to fasten said tool in said socket.

3. A fastening device for gun tools, comprising a sheet metal plate, a socket formed in said plate, a clip on said plate, a cooperating member on said tool, said clip and cooperating member provided with apertures and locking means adapted to pass through said apertures to fasten said tool in said socket.

BRYAN P. JOYCE.